(Model.)
A. W. KENNY & H. NIEMANN.
SEED SOWER.
No. 248,932. Patented Nov. 1, 1881.
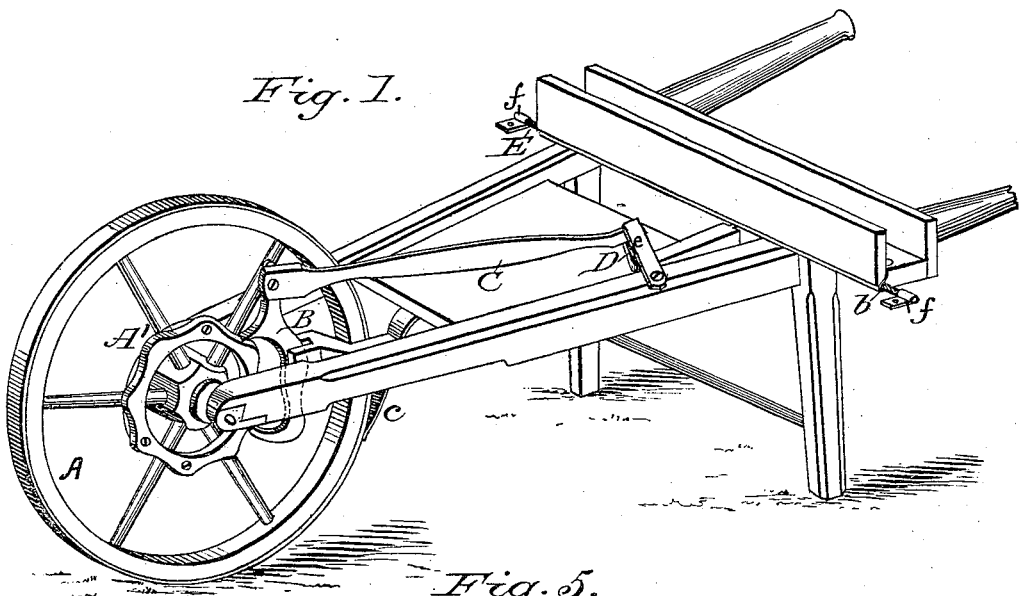
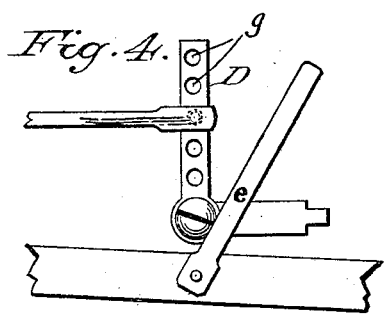
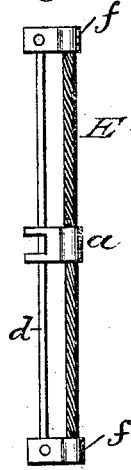
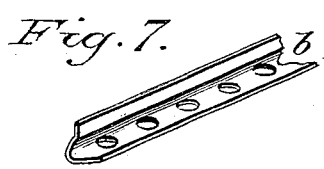
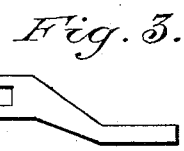
Witnesses:
John G. Clark
Darwin C. Griffen
Inventor:
Anthony W. Kenny
Henry Niemann

United States Patent Office.

ANTHONY W. KENNY AND HENRY NIEMANN, OF YPSILANTI, MICHIGAN, ASSIGNORS OF ONE-HALF TO JOHN McCULLOUGH AND WILLIAM L. McCULLOUGH, BOTH OF SAME PLACE.

SEED-SOWER.

SPECIFICATION forming part of Letters Patent No. 248,932, dated November 1, 1881.

Application filed April 7, 1881. (Model.)

*To all whom it may concern:*

Be it known that we, ANTHONY W. KENNY and HENRY NIEMANN, of the city of Ypsilanti, Washtenaw county, Michigan, have invented a new and useful Improvement in Seed-Sowers, which improvement is fully set forth in the following specification and accompanying drawings, in which—

Figure 1 is a perspective view of a wheelbarrow with our seed-sower attached. Fig. 2 is the dog, which works in the cam-wheel A'. Fig. 3 is a guide attached to the frame-work of the barrow, and holds the pivot upon which the dog works. Fig. 4 is a bell-crank and a rod connecting the upper end of the dog with the bell-crank. Fig. 5 is a wire rope and rod running parallel thereto, with clamp holding the wire rope. Fig. 6 is the seed-box without the cover. Fig. 7 is a metal corner-piece attached to the front under side of the seed-box, through which holes are pierced to allow the seed to drop out, and in which said wire rope is worked with a lateral motion imparted to it by the working of the bell-crank.

The object of our invention is to furnish a device by which grass-seed and other small seed may be uniformly and evenly distributed over the surface of the ground in quantity to suit the operator.

In the drawings, A' is the cam-wheel, firmly attached to the barrow-wheel A.

B is the dog, which works in the cam.

C is the rod connecting the dog with the bell-crank D, and by which a lateral motion is imparted to the wire rope E when connected thereto by the clamp *a* and the wheel rotated.

*b* is the metal corner-piece, which forms the corner of the seed-box, as shown in Fig. 1, and in which the wire rope reciprocates.

*c* is a metal spring, the free end of which rests upon the periphery of the barrow-wheel to prevent clay or other matter from adhering thereto, thus giving a uniform rotation to said wheel over any given space.

It will be seen that when the barrow is propelled the wire rope will be given a reciprocating lateral motion which will force the seed to the apertures in the bottom side of the seed-box and allow them to drop to the ground. The wire rope has at its ends metal clamps *f*, which are fastened to a rigid rod, *d*, for the purpose of stiffening said rope.

The bell-crank D has in one of its arms several holes, *g*, for receiving a pin on the end of the rod C, which pin is held in place by the free end of a spring, *e*, which presses on the end of said rod C, as represented in Fig. 1. By this construction the amount of movement of the wire rope can be regulated. The corner of the seed-box being made of metal, and the rope being also of metal, the feed will not be affected by any change in the weather, there will be but little friction, and no liability to wear or get out of repair.

We are aware that ropes have been used in seed-sowers for distributing the seed, and also that seed-slides have been operated by means of levers and cam-wheels, and therefore we make no claim to these features broadly.

Having thus described our invention, what we claim as new, and desire to secure by Letters Patent, is—

1. In a seeding-machine, the wheel A, cam A', centrally-pivoted dog B, having arms to engage with said cam, adjustable connecting-rod C, and bell-crank D, in combination with the distributing-wire E, connected at its ends to the rod *d*, and moving in perforated metal ways *b* of the seed-box, substantially as and for the purpose specified.

2. The wheel A, cam A', centrally-pivoted lever B, and connecting-rod C, having a projecting pin at one end, in combination with the bell-crank D, having perforations in one arm to receive said pin, and the pivoted spring *e*, moving with the bell-crank and adapted to hold the end of the connecting-rod in place, substantially as described.

ANTHONY W. KENNY.
HENRY NIEMANN.

Witnesses:
CHARLES E. KING,
JACOB H. MARTIN.